United States Patent
Lee et al.

(10) Patent No.: US 11,909,156 B2
(45) Date of Patent: Feb. 20, 2024

(54) CONNECTION STRUCTURE FOR CONNECTING POWER CABLE AND CONDUCTOR LEAD-OUT ROD, AND CONNECTION DEVICE FOR CONNECTING POWER CABLE AND CONDUCTOR LEAD-OUT ROD

(71) Applicant: LS CABLE & SYSTEM LTD., Anyang-si (KR)

(72) Inventors: Duk Kyu Lee, Gumi-Si (KR); Dong Yun Oh, Gumi-Si (KR); Jung Jin Lee, Gumi-Si (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 750 days.

(21) Appl. No.: 16/979,689

(22) PCT Filed: Jan. 9, 2019

(86) PCT No.: PCT/KR2019/000328
§ 371 (c)(1),
(2) Date: Sep. 10, 2020

(87) PCT Pub. No.: WO2019/177248
PCT Pub. Date: Sep. 19, 2019

(65) Prior Publication Data
US 2021/0050679 A1   Feb. 18, 2021

(30) Foreign Application Priority Data
Mar. 14, 2018  (KR) .......................... 10-2018-0029549

(51) Int. Cl.
*H01R 4/02* (2006.01)
*H01R 4/56* (2006.01)
(Continued)

(52) U.S. Cl.
CPC ............... *H01R 4/56* (2013.01); *H01R 4/308* (2013.01); *H01R 4/36* (2013.01); *H02G 15/06* (2013.01)

(58) Field of Classification Search
CPC . H01R 4/01; H01R 4/02; H01R 4/021; H01R 4/023; H01R 4/28; H01R 4/30;
(Continued)

(56) References Cited

U.S. PATENT DOCUMENTS 9,429,594 B2 * 8/2016 Bolcato .............. H01R 13/5845
2016/0134094 A1 * 5/2016 Wentzel ............... H02G 15/068
29/857

FOREIGN PATENT DOCUMENTS

DK   WO 2018/041321 A1 * 3/2018 ............... H01R 4/02
JP          H07170643 A      7/1995
(Continued)

OTHER PUBLICATIONS

Extended European Search Report for related European Application No. 19767484.9; action dated Mar. 4, 2022; (10 pages).
(Continued)

*Primary Examiner* — William H. Mayo, III
(74) *Attorney, Agent, or Firm* — K&L Gates LLP

(57) ABSTRACT

A connection structure for connecting a power cable and a conductor lead-out rod to minimize electrical resistance of a contact surface, and conductor connection device of a power cable may be provided with at least one conducting bolt configured to be fastened into a fastening hole to apply pressure to conductive particles injected into an accommodation space so as to electrically connect a conductor part and a conductor lead-out rod; and a fixing bolt configured to be fastened into the fastening hole to fix the conductor part inserted into an accommodation groove of the conductor lead-out rod.

19 Claims, 7 Drawing Sheets

(51) Int. Cl.
*H01R 4/30* (2006.01)
*H01R 4/36* (2006.01)
*H02G 15/06* (2006.01)

(58) Field of Classification Search
CPC . H01R 4/301–4/308; H01R 4/34; H01R 4/36; H01R 4/44; H01R 4/56; H01R 4/58; H01R 9/05; H01R 9/0503; H01R 9/0518; H05G 15/06
USPC .............. 174/74 R, 75 R, 74 C, 78, 79, 84 R
See application file for complete search history.

(56) References Cited

FOREIGN PATENT DOCUMENTS

| | | | |
|---|---|---|---|
| JP | 2015171170 A | 9/2015 | |
| JP | 2017-016910 A * | 1/2017 | ............. H01R 11/01 |
| JP | 2017016910 A | 1/2017 | |
| KR | 101108309 B1 | 1/2012 | |
| KR | 1020170042167 A | 4/2017 | |
| WO | 2018041321 A1 | 3/2018 | |

OTHER PUBLICATIONS

International Search Report for related International Application No. PCT/KR2019/000328; report dated Sep. 19, 2019; (5 pages).
Written Opinion for related International Application No. PCT/KR2019/000328; report dated Sep. 19, 2019; (9 pages).

* cited by examiner

CONNECTION STRUCTURE FOR CONNECTING POWER CABLE AND CONDUCTOR LEAD-OUT ROD, AND CONNECTION DEVICE FOR CONNECTING POWER CABLE AND CONDUCTOR LEAD-OUT ROD

CROSS-REFERENCE TO RELATED APPLICATIONS

The present application is a National Stage of International Application No. PCT/KR2019/000328, filed Jan. 9, 2019, which claims priority to Korean Application No. 10-2018-0029549, filed Mar. 14, 2018, the disclosure of which are incorporated herein by reference.

FIELD

The present disclosure relates to a connection structure for connecting a power cable and a power cable conductor, and a conductor connection device of a power cable. More particularly, the present disclosure relates to a connection structure for connecting a power cable and a conductor lead-out rod to minimize electrical resistance of a contact surface, and conductor connection device of a power cable.

BACKGROUND

In general, a power cable is installed under or on the ground or at the sea bottom to supply power to a desired place using a conductor that supplies power. It is very important to insulate the conductor of the power cable. To this end, an insulating layer for insulating the conductor is formed of cross-linked polyethylene (XLPE) and the like or formed by rolling up insulating paper.

Power cables are connected at intervals of several hundred meters or tens of kilometers through a joint box, and ends of the power cables are connected to overhead lines by a termination connection box.

Examples of the joint box include a tape-type junction box (TJ), a prefabricated junction box (PJ), a pre-mold junction box (PMJ), a heterogeneous junction box, and the like. Examples of the termination connection box include an aerial termination connection box (EB-A), a gas-immersed termination connection box (EB-G), an oil-immersed termination connection box (EB-O), and the like according to a connection state of an end of a conductor taken out of a cable.

The aerial termination connection box (EB-A) is used to connect an overhead line and an underground line in an outdoor substation. The gas-immersed termination connection box (EB-G) is generally installed in an indoor substation and used in a limited space or when the distances to other buildings are limited. The oil-immersed termination connection box (EB-O) is similar to the gas-immersed termination connection box and is used when a cable and a transformer are connected within an oil-immersed case.

The termination connection box may include an insulator storing insulating oil, a power cable inserted into the insulating tube, and a conductor lead-out rod, one end of which is fixed to a conductor part inside the power cable and another end of which is exposed to the outside of the insulating tube.

In the related art, in order to connect a power cable and a conductor lead-out rod of a termination connection box, insulating layers of strands of a conductor part are removed, the resultant strands are gathered, the power cable and the conductor lead-out rod of the termination connection box, which are to be connected to each other, are brought into contact with each other and are thereafter compressed.

However, the method of connecting the power cable and the conductor lead-out rod of the termination connection box by removing the insulating layers of the strands of the conductor part and gathering and compressing the resultant strands is disadvantageous in that it takes a long time to perform the work, there are potential quality risks due to the scattering of a conductive material during the removal of the insulating layers, and considerable work proficiency is required.

BRIEF SUMMARY

The present disclosure is directed to providing a connection structure for connecting a power cable and a conductor lead-out rod to minimize electrical resistance of a contact surface, and a conductor connection device of a power cable.

To achieve these objects, the present disclosure provides a connection structure, for connecting a power cable and a conductor lead-out rod, which connects a conductor part including a plurality of wires of a power cable to a conductor lead-out rod of a termination connection box, the connection structure comprising: a conductor part of a power cable; an adapter configured into which the conductor part is inserted through an open lower end thereof, the adapter being formed in a cylindrical shape, an upper end and the lower end of which are open; a conductor lead-out rod providing an accommodation groove into which the conductor part of the power cable inserted into the adapter is inserted via an opening in a lower end thereof, the conductor lead-out rod including a plurality of fastening holes; a plurality of conductive particles injected into an accommodation space on an upper end of the conductor part inserted into the accommodation groove of the conductor lead-out rod to electrically connect the conductor part and the conductor lead-out rod; at least one conducting bolt configured to be fastened into the fastening hole to apply pressure to the conductive particles injected into the accommodation space so as to electrically connect the conductor part and the conductor lead-out rod; and a fixing bolt configured to be fastened into the fastening hole to fix the conductor part inserted into the accommodation groove.

And the conducting bolt and the fixing bolt each may comprise a fracture bolt, a head portion of which is fractured and separated when a torque of a predetermined magnitude or more is applied thereto.

And when the conducting bolt is fastened while the conductive particles are injected into the accommodation space, the conducting bolt passes through the adapter and may be brought into contact with the conductive particles compressed by an upper end of the conductor part and the conducting bolt to reduce voids therein.

And the conductive particles may comprise silver, copper, an alloy thereof, or a metal material plated with silver, copper or the alloy thereof.

And the conductive particles may comprise cut copper wires or silver-plated cut copper wires.

And the conductor lead-out rod and the adapter may be each formed of tin-plated copper or a tin-plated copper alloy.

And the fixing bolt and the conducting bolt may be each formed of brass or a brass alloy.

And a thickness of the adapter may be in a range of 0.1 mm to 1.0 mm.

And the conductor lead-out rod may comprise a body part providing the accommodation groove which has an opening in a lower end thereof and into which an upper end of the conductor part inserted into the adapter is inserted; and an extension extending upward from an upper end of the body part, and a plurality of conducting fastening holes into which a plurality of conducting bolts are fastened are provided in an upper portion of the body part at predetermined intervals in a circumferential direction, and a plurality of fixing fastening holes into which a plurality of fixing bolts are fastened are provided in a lower portion of the body part at predetermined intervals in the circumferential direction.

And the conducting fastenings hole and the fixing fastening holes may be alternately formed in a direction perpendicular to the body part.

And to achieve these objects, the present disclosure provides a connection structure, for connecting a power cable and a conductor lead-out rod, which connects a conductor part including a plurality of wires of a power cable to a conductor lead-out rod of a termination connection box, the connection structure comprising: a conductor part of a power cable; an adapter configured into which the conductor part is inserted through an open lower end thereof, the adapter being formed in a cylindrical shape, an upper end and the lower end of which are open; a conductor lead-out rod providing an accommodation groove into which the conductor part of the power cable inserted into the adapter is inserted into an opening in a lower end thereof, the conductor lead-out rod including: a stopper configured to prevent the adapter from being inserted above a predetermined height into the accommodation groove during the insertion of the conductor part of the power cable, the stopper being formed on an inner circumference of the accommodation groove; and a plurality of fastening holes; a plurality of conductive particles injected into an accommodation space in an upper portion of an upper end of the conductor part inserted into the accommodation groove of the conductor lead-out rod, the conductive particles being exposed via the accommodation groove during the insertion of the conductor part into the accommodation groove, thus electrically connecting the conductor part and the conductor lead-out rod; at least one conducting bolt configured to be fastened into the fastening hole to apply pressure to the conductive particles injected into the accommodation space so as to electrically connect the conductor part and the conductor lead-out rod; and a fixing bolt configured to be fastened into the fastening hole to fix the conductor part inserted into the accommodation groove.

And the conducting bolt and the fixing bolt each may comprise a fracture bolt, a head portion of which is fractured and separated when a torque of a predetermined magnitude or more is applied thereto.

And when the conducting bolt may be fastened while the conductive particles are injected into the accommodation space, the conducting bolt is brought into contact with the conductive particles compressed by an upper end of the conductor part and the conducting bolt to reduce voids therein.

And the conductor lead-out rod comprises: a body part providing the accommodation groove which includes an opening at a lower end thereof and into which the upper end of the conductor part inserted into the adapter is inserted; and an extension extending upward from the upper end of the body part, and a plurality of conducting fastening holes into which a plurality of conducting bolts are fastened are formed on an upper portion of the body part at predetermined intervals in a circumferential direction, and a plurality of fixing fastening holes into which a plurality of fixing bolts are fastened are formed on a lower portion of the body part at predetermined intervals in the circumferential direction.

And the conducting fastening hole may be formed on the upper portion of the body part at a height equal to or greater than a height of insertion of the adapter.

And to achieve these objects, the present disclosure provides a conductor connection device for connecting a conductor part of a power cable to a conductor lead-out rod, the conductor connection device comprising: an adapter, an upper end and a lower end of which are open and thus into which an upper end of the conductor part is inserted through the lower end; a conductor lead-out rod providing an accommodation groove, a lower end of which is open and thus into which the conductor part inserted into the adapter is inserted, the conductor lead-out rod including: a plurality of conducting fastening holes provided at predetermined intervals in a circumferential direction; and a plurality of fixing fastening holes provided at predetermined intervals below the plurality of conducting fastening holes in the circumferential direction; at least one conducting bolt fastened into the conducting fastening hole to electrically connect the conductor part and the conductor lead-out rod; at least one fixing bolt fastened into the fixing fastening hole to fix the conductor part accommodated in the accommodation groove of the conductor lead-out rod; and a plurality of conductive particles accommodated in an accommodation space on an upper end of the conductor part inserted into the accommodation groove of the conductor lead-out rod to electrically connect the conductor part and the conductor lead-out rod.

And to achieve these objects, the present disclosure provides a conductor connection device for connecting a conductor part of a power cable to a conductor lead-out rod, the conductor connection device comprising: an adapter, an upper end and a lower end of which are open and thus into which an upper end of the conductor part is inserted through the lower end; a conductor lead-out rod providing an accommodation groove, a lower end of which is open and thus into which the conductor part inserted into the adapter is inserted, the conductor lead-out rod including: a plurality of conducting fastening holes provided at predetermined intervals in a circumferential direction; and a plurality of fixing fastening holes provided at predetermined intervals below the plurality of conducting fastening holes in the circumferential direction, wherein a stopper is provided on an inner circumference of the accommodation groove to prevent the adapter from being inserted above a predetermined height during the insertion of the conductor part of the power cable; at least one conducting bolt fastened into the conducting fastening hole to electrically connect the conductor part and the conductor lead-out rod; at least one fixing bolt fastened into the fixing fastening hole to fix the conductor part accommodated in the accommodation groove of the conductor lead-out rod; and a conductive particles accommodated in an accommodation space on an upper end of the conductor part inserted into the accommodation groove of the conductor lead-out rod, the conductive particles being exposed via the accommodation groove during downward movement of the adapter, thus electrically connecting the conductor part and the conductor lead-out rod.

And the conducting fastening hole may be formed on the upper portion of the body part at a height equal to or greater than a height of insertion of the adapter.

And the accommodation groove may comprise: a conductive particle accommodation groove provided above the stopper to accommodate the conductive particles; and a conductor part accommodation groove which is provided below the stopper and into which the conductor part injected into the adapter is inserted.

And the conducting fastening hole may be formed to communicate with the conductive particle accommodation groove, and the fixing fastening hole is formed to communicate with the conductor part accommodation groove.

DETAILED DESCRIPTION

Hereinafter, exemplary embodiments of the present disclosure will be described in detail. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

Figure 1:
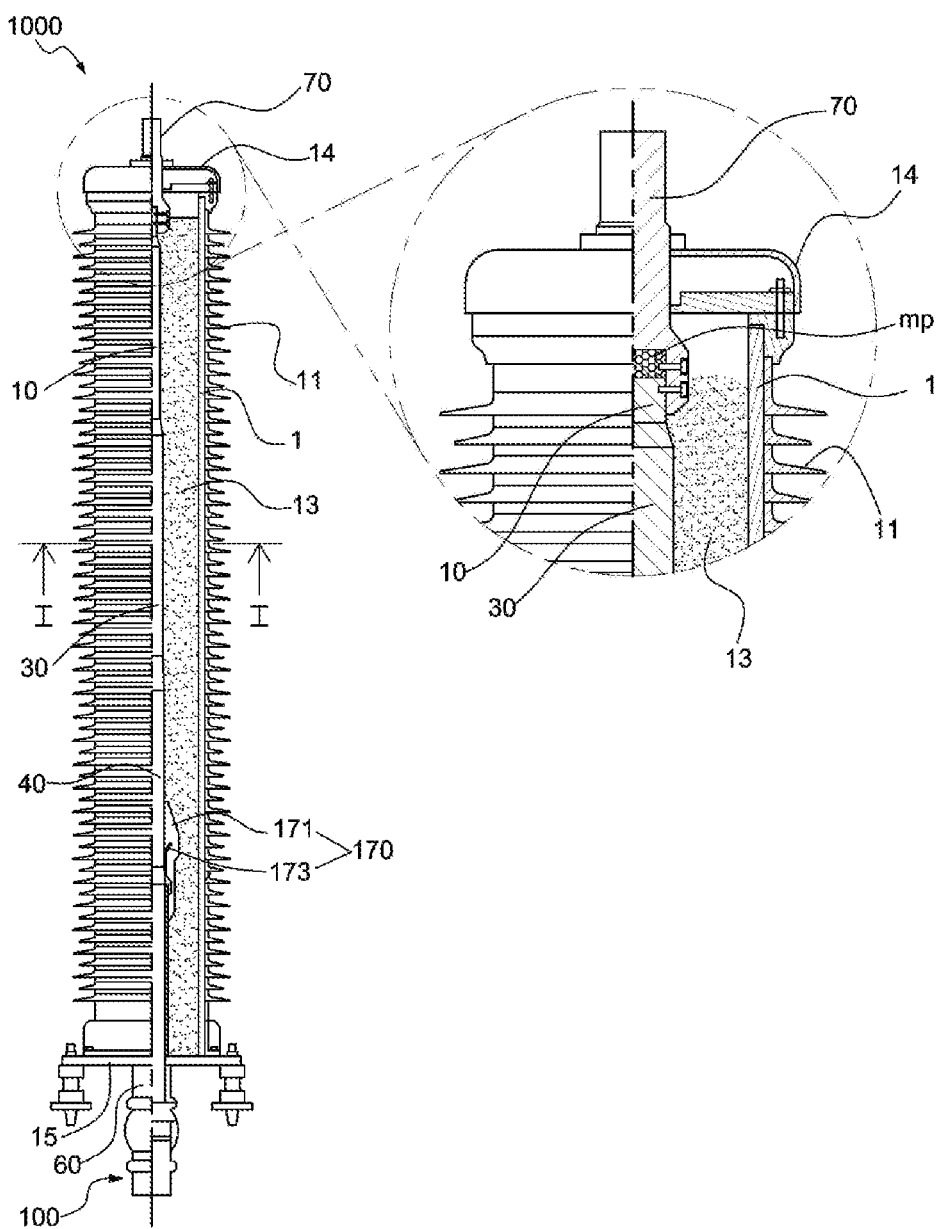
FIG. 1 illustrates an example of a connection box.

FIG. 1 illustrates an example of a termination connection box 1000 provided with a power cable and a conductor connection device. Hereinafter, the present disclosure will be described with respect to the structure of an aerial termination connection box, but a conductor connection device of power cable, a structure for connecting a power cable and a conductor lead-out rod, and a method of connecting a power cable and a conductor lead-out rod according to the present disclosure are applicable to various types of connection boxes such as a gas-immersed termination connection box (EB-G).

The termination connection box 1000 of FIG. 1 includes an insulating tube 1 providing a space for storing insulating oil 13, a power cable 100 fixed into the insulating tube, and a conductor lead-out rod 70, one end of which is electrically connected to the power cable 100 and another end of which is exposed to the outside of the insulating tube 1.

The insulating tube 1 may be provided in various shapes for storing the insulating oil 13. In FIG. 1, the insulating tube 1 may include an empty tube body having a cylindrical shape, an upper bracket 14 coupled to the tube body to form an upper surface of the tube body, and a lower bracket 15 coupled to the tube body to form a lower surface of the tube body. The insulating oil 13 electrically insulates the power cable 100 and an inner circumferential surface of the insulating tube 1.

The power cable 100 is fixed into the insulating tube 1 while passing through the lower bracket 15. That is, the insulating tube 1 insulates and supports the power cable 100. Accordingly, electrical insulation strength of the insulating tube 1 should be sufficiently high. To this end, a plurality of corrugations/protrusions 11 are provided on a circumferential surface of the insulating tube 1. The electrical insulation strength of the insulating tube may be improved by increasing an insulation distance using the corrugations/protrusions 11. The insulating tube 1 is preferably manufactured using hard ceramics or a polymer resin so that the insulating tube 1 may have insulation strength and an appropriate level of strength thereof may be maintained.

The power cable 100 is provided to pass through the lower bracket 15 and be fixed into the insulating tube 1. An upper end of the power cable 100 located inside the insulating tube 1 is coupled to the conductor lead-out rod 70 formed of a conductor at the top of the insulating tube 1.

Figure 2:
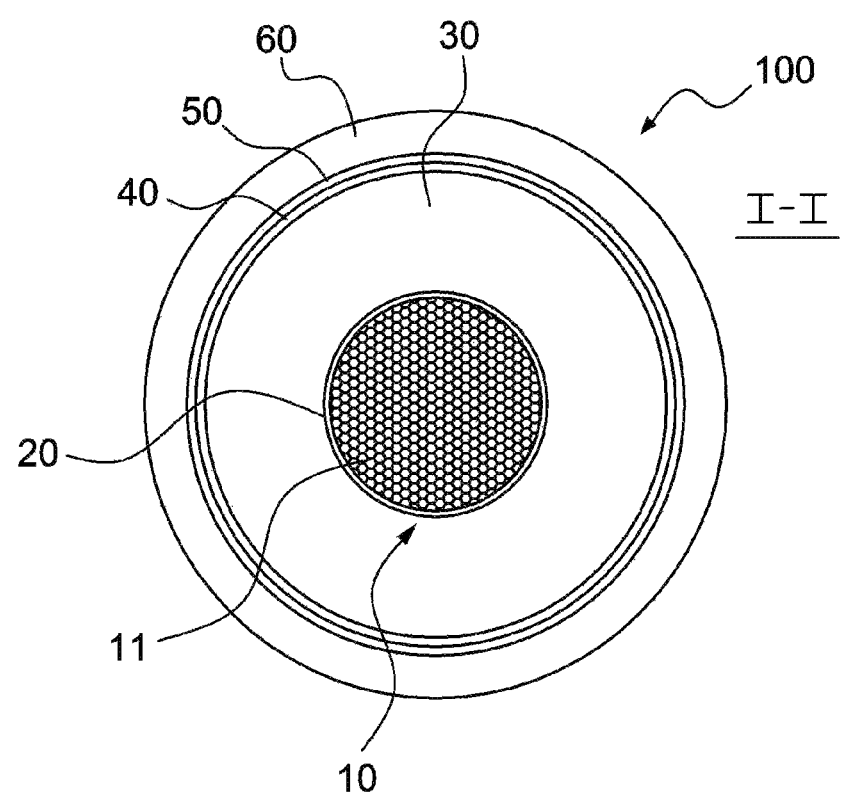
FIG. 2 illustrates an example of a power cable.

As illustrated in FIG. 2, the power cable 100 connectable using a conductor connection structure according to the present disclosure includes a conductor part 10, an inner semiconducting layer 20 surrounding the conductor part 10, an insulating layer 30 surrounding the inner semiconducting layer 20, an outer semiconducting layer 40 surrounding the insulating layer 30, a shielding layer 50 surrounding the outer semiconducting layer 40 and formed of a metal sheath or a neutral wire for electrical shielding and return of short-circuit current, and a sheath 60 surrounding the shielding layer 50.

The conductor part 10 may be a wire formed of copper or aluminum, and preferably, copper, or a stranded wire consisting of a plurality of such wires. Specifications of the conductor part 10, including a diameter of the conductor part 10, a diameter of wires 11 constituting the stranded wire, etc. may vary according to a transmission voltage, usage, etc. of the power cable 100 including the conductor part 10, and may be appropriately selected by a designer. When the conductor part 10 includes the wires 11 and each of the wires 11 is provided in an insulated state, conductor resistance decreases due to the skin effect, thereby maximizing a power transmission rate.

The inner semiconducting layer 20 of the power cable 100 is provided between the conductor part 10 and the insulating layer 30 to remove an air layer causing delamination between the conductor part 10 and the insulating layer 30 and to alleviate local electric field concentration.

The outer semiconducting layer 40 allows a uniform electric field to be applied to the insulating layer 30, alleviates local electric field concentration, and protects the insulating layer 30 from the outside.

The inner semiconducting layer 20 and the outer semiconducting layer 40 are formed by extrusion of a semiconducting composition in which conductive particles, such as carbon black, carbon nanotubes, carbon nanoplates or graphite, are dispersed in a base resin and a crosslinking agent, an antioxidant, a scorch inhibitor, or the like is additionally added.

Here, the base resin may be an olefin resin similar to a base resin of an insulating composition for forming the insulating layer 30 for interlayer adhesion between the inner semiconducting layer 20 and the outer semiconducting layer 40 and the insulating layer 30.

The insulating layer 30 may include, for example, a polyolefin resin, such as polyethylene or polypropylene, as a base resin, and may be preferably formed by extruding an insulating composition containing a polyethylene resin as a base resin.

The polyethylene resin may include ultra-low-density polyethylene (ULDPE), low-density polyethylene (LDPE), linear low-density polyethylene (LLDPE), medium-density polyethylene (MDPE), high-density polyethylene (HDPE), or the like. In the case of a high-voltage cable, existing OF cables are being quickly replaced with cross-linked polyethylene (XLPE) insulated cables.

The sheath 60 which is an outermost portion of the power cable 100 may be formed of polyethylene, polyvinyl chloride, or polyurethane.

Referring back to FIG. 1, the power cable 100 passes through the lower bracket 15 such that an end portion thereof is located inside the insulating tube 1, and the conductor part 10 is exposed via an end of the power cable 100 inside the insulating tube 1.

That is, the end portion of the conductor part 10 is exposed via the end of the power cable 100 inside the insulating tube 1 when the sheath 60, the shielding layer 50, the outer semiconducting layer 40, the insulating layer 30 and the inner semiconducting layer 20, which cover the conductor part 10, are removed.

The power cable 100 except the end of the power cable 100 may be inserted into the insulating tube 1 in a state in which the insulating layer 30 and the outer semiconducting layer 40 are exposed. That is, as illustrated in FIG. 1, the power cable 100 may be fixed into the insulating tube 1 in a state in which the conductor part 10, the insulating layer 30, and the outer semiconducting layer 40 are exposed inside the insulating tube 1.

When the power cable 100 from which a part of the outer semiconducting layer 40 is removed to expose the insulating layer 30 is inserted into the insulating tube 1, an electric field may be concentrated at an end of the outer semiconducting layer 40 when a voltage is applied between the outer semiconducting layer 40 and the inner semiconducting layer 20. The concentration of the electric field may cause damage to the outer semiconducting layer 40 and the insulating layer 30. Accordingly, an electric-field mitigating cone 170 may be provided inside the insulating tube 1 to relieve concentration of an electric field in the power cable 100.

The electric-field mitigating cone 170 may include a semiconducting part 173 connected to the outer semiconducting layer 40 of the power cable 100 and an insulating part 171 covering the semiconducting part 173. The insulating part 171 provided outside the electric-field mitigating cone 170 is formed of, for example, liquid silicone rubber (LSR) and is provided outside the electric-field mitigating cone 170 to ensure insulation performance.

The conductor lead-out rod 70 is a conductive member provided to pass through the upper bracket 14 such that a lower end thereof is coupled to an end of the conductor part 10 and an upper end thereof is exposed to the outside.

According to the related art, for connection to the wire-insulated power cable 100 having the configuration as described above, insulating layers of wires are removed, the conductor part 10 of the power cable 10 is inserted into the conductor lead-out rod 70, and the conductor lead-out rod 70 is compressed. In contrast, according to the present disclosure, as described below, the conductor part 10 and the conductor lead-out rod 70 may be electrically connected by inserting the conductor part 10 of the power cable 100, which is to be connected, into the conductor lead-out rod 70, injecting conductive particles mp into a center of the conductor part 10, and fastening the conductor part 10 and the conductor lead-out rod 70 by a conducting bolt 310. This will be described in detail with reference to the drawings below.

Figure 3:
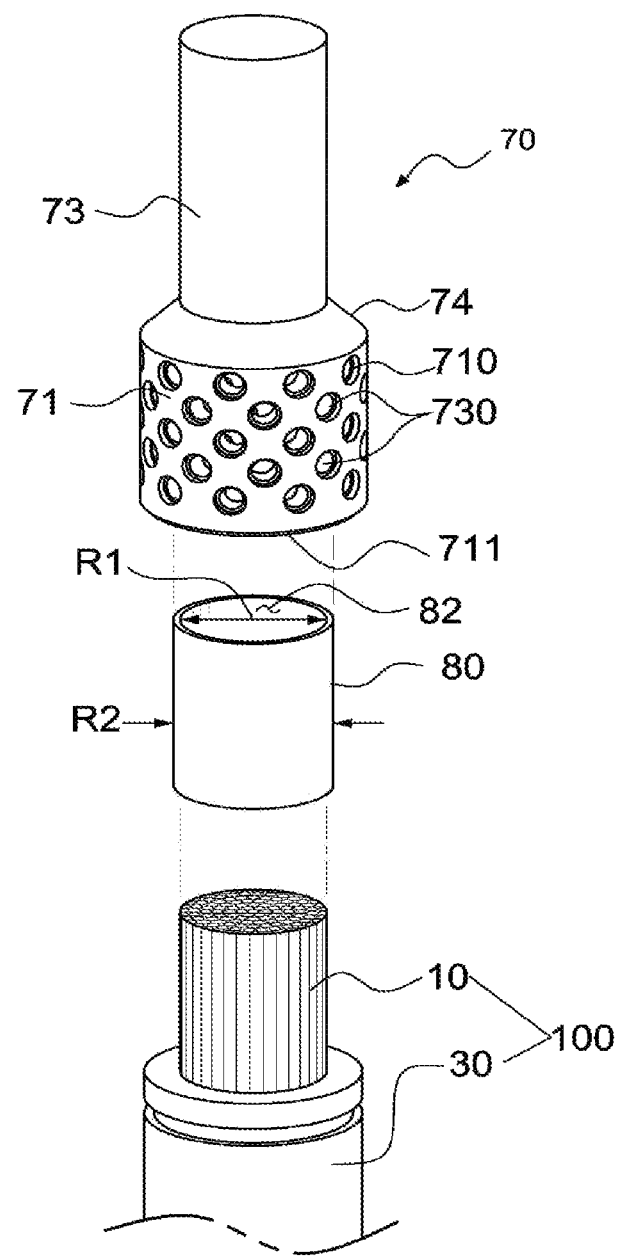
FIG. 3 is an exploded perspective view of a connection structure for connecting a power cable and a conductor lead-out rod according to an embodiment of the present disclosure.

FIG. 3 is an exploded perspective view of a connection structure for connecting a power cable and a conductor lead-out rod according to an embodiment of the present disclosure.

First, as illustrated in FIG. 2, a power cable 100 connectable by the connection structure therefor according to the present disclosure may include a conductor part 10, an inner semiconducting layer 20 surrounding the conductor part 10, an insulating layer 30 surrounding the inner semiconducting layer 20, an outer semiconducting layer 40 surrounding the insulating layer 30, a shielding layer 50 surrounding the outer semiconducting layer 40 and formed of a metal sheath or a neutral wire for electrical shielding and return of short-circuit current, a sheath 60 surrounding the shielding layer 50, and the like.

A conductor connection device, of a power cable, for connecting the conductor part 10 consisting of a plurality of strands of the power cable 100 according to the present disclosure to a termination connection box may include: an adapter 80, an upper end and a lower end of which are open so that an upper end portion of the conductor part 10 may be inserted via the lower end of the adapter 80; a conductor lead-out rod 70 providing an accommodation groove 71a having an open lower end into which an upper end of the conductor part 10, when inserted into the adapter 80, is inserted (see FIG. 5), and including a plurality of conducting fastening holes 710 provided at predetermined intervals in a circumferential direction and a plurality of fixing fastening holes 730 provided at predetermined intervals in the circumferential direction and below the plurality of conducting fastening holes 710; at least one conducting bolt 310 each fastened into one of the conducting fastening holes 710 to electrically connect the conductor part 10 to the conductor lead-out rod 70; at least one fixing bolt 330 each fastened into one of the fixing fastening hole 730 to fix the conductor part 10 accommodated in the accommodation groove 71a of the conductor lead-out rod 70; and a plurality of conductive particles mp accommodated in an accommodation space between an upper end of the conductor part 10 and an upper end of the adapter 80 to electrically connect the conductor part 10 and the conductor lead-out rod 70.

Here, the accommodation space refers to a space of the accommodation groove 71a excluding an area occupied by the conductor part 10 when the conductor part 10 is inserted thereinto.

Referring to FIG. 3, a conductor connection structure of the power cable 100 according to the present disclosure may include the conductor lead-out rod 70 into which the conductor part 10 of the power cable 100 is inserted to be electrically connected and fixed.

The conductor part 10 of the power cable 100 is inserted into the accommodation groove 71a of a body part 71 while being inserted by a certain length into the adapter 80.

In this case, the length by which the upper end of the conductor part 10 of the power cable 100 is inserted into the adapter 80 is set to be smaller than a total length of the adapter 80. That is, as illustrated in FIG. 3, the upper end of the conductor part 10 is set to be lower than the upper end of the adapter 80 when the upper end of the conductor part 10 is inserted through the lower end of the adapter 80.

In this case, an accommodation space 82 for accommodating the conductive particles mp may be provided between the upper end of the conductor part 10 of the power cable 100 and the upper end of the adapter 80.

Therefore, after inserting the conductor part 10 into the adapter 80, the conductive particles mp may be injected into the accommodation space 82 to fill the accommodation space 82 with the conductive particles mp.

In this case, the conductive particles mp are injected through the open upper end of the adapter 80 and thus the conductive particles mp may be uniformly dispersed and supplied.

In addition, because the conductive particles mp are accommodated in the upper end of the conductor part 10 inside the adapter 80, loss of the conductive particles mp may be prevented and the conductor part 10 may be stably inserted into the accommodation groove 71a even when the conductor part 10 is inserted into the accommodation groove 71a of the body part 71.

The adapter 80 should have rigidity sufficient to provide the accommodation space 82 for accommodating the conductive particles mp even when the conductor part 10 is inserted thereinto, and have rigidity that is within a range to be penetrated by the conducting bolt 310 when a certain torque or more is applied to the conducting bolt 310, because the conducting bolt 310 should pass through the adapter 80 to apply pressure to the conductive particles mp when the conducting bolt 310 is fastened as will be described below.

In addition, the adapter 80 is preferably formed of a material having high electrical conductivity because it is located between a side surface of the conductor part 10 and an inner wall of the accommodation groove 71a of the conductor lead-out rod 70 in the conductor connection structure according to the present disclosure.

Thus, the adapter 80 may be formed of a copper material having a thickness of approximately 0.5 mm to 1.0 mm.

Because the conductor part 10 is inserted into the adapter 80, an inner diameter R1 of the adapter 80 may approximately correspond to or be greater by a certain value than an outer diameter of the conductor part 10. In addition, because the adapter 80 is inserted into the accommodation groove 71a of the body part 71, an outer diameter R2 of the adapter 80 may approximately correspond to or be less by an inner diameter R3 of the accommodation groove 71a of the body part 71 (see FIG. 4).

The conductor lead-out rod 70 may provide the accommodation groove 71a into which the conductor part 10 of the power cable 100 inserted into the adapter 80 is inserted through an opening 711 in a lower end thereof, and include a plurality of fastening holes 710 and 730.

For example, as illustrated in FIG. 3, the conductor lead-out rod 70 may include the body part 71 providing the accommodation groove 71a which has the opening 711 in the lower end and into which an upper end of the conductor part 10 is inserted, and an extension 73 extending upward from an upper end of the body part 71.

The accommodation groove 71a may be provided in the body part 71, into which the conductor part 10 is inserted via the opening 711 in the lower end of the conductor part 10, and the extension 73 extending upward from the body part 71 may be exposed to the outside via an upper portion of the termination connection box as described above and connected to an overhead line.

In this case, a diameter of the extension 73 may be less than that of the body part 71, and an inclined connection part 74 may be provided between the body part 71 and the extension 73 in this case.

That is, the extension 73 is coupled to the body part 71 through the inclined connection part 74, and an outer diameter from the extension 73 toward the body part 71 increases through the inclined connection part 74.

In this case, the conductor lead-out rod 70 may be formed of a metal material having high electrical conductivity, and for example, the conductor lead-out rod 70 may be made of tin-plated copper or tin-plated copper alloy material.

In addition, the body part 71 of the conductor lead-out rod 70 may be provided with fastening holes to be fastened with a plurality of bolts.

Specifically, a plurality of fastening holes 710 into which a plurality of conducting bolts 310 are fastened may be formed at predetermined intervals on the upper portion of the body part 71 along the circumferential direction.

Among the plurality of fastening holes formed in the body part 71, a fastening hole formed in upper portion of the body part 71 is the conducting fastening hole 710 to be fastened with the conducting bolt 310 for electrically connecting the conductor part 10 and the conductor lead-out rod 70 by applying pressure to the conductive particles mp injected into an accommodation space between the conductor part 10 and the ceiling of accommodation groove 71a in a state in which the conductor part 10 of the power cable 100 to be connected is inserted into the accommodation groove 71a of the body part 71.

Similarly, a plurality of fixing fastening holes 730 to be fastened with a plurality of fixing bolts 330 may be formed at predetermined intervals below the body part 71 in a circumferential direction.

Among the plurality of fastening holes formed in the body part 71, a fastening hole formed in a lower portion of the body part 71, i.e., below the conducting fastening hole 710, is the fixing fastening hole 730 to be fastened with the fixing bolt 330 to connect and fix the conductor part 10 and the conductor lead-out rod 70 in a state in which the conductor part 10 of the power cable 100 to be connected is inserted into the body part 71.

When the fixing bolt 330 is fastened into the fixing fastening hole 730, a portion of the conductor part 10 to be fastened may be plastically deformed or penetrated, thereby preventing movement of the conductor part 10 in a lengthwise direction of the conductor lead-out rod 70 or in a vertical direction of FIG. 3.

The conducting fastening hole 10 fastened with the conducting bolt 310 of FIG. 3 may be formed at a position corresponding to the accommodation space, for accommodation of the conductive particles mp, of the upper portion of the body part 71. Therefore, a plurality of conducting fastening holes 210 may be formed at predetermined intervals along the circumference of the upper portion of the body part 71.

Similarly, the fixing fastening holes 730 may be formed at predetermined intervals in a lower region of the body part 71, i.e., below the conducting fastening holes 710, along the circumferences of positions spaced the same distance from each other in the lengthwise direction of the body part 71.

In this case, as illustrated in FIG. 3, adjacent fastening holes may be alternately formed in the longitudinal direction of the body part 71 or in a direction perpendicular to the body portion 71. This is to disperse an effect of fixing the fixing bolt 330 to the entire conductor part 10 and prevent an effect of compressing the conductive particles mp using the conducting bolt 310 from being concentrated in a specific region.

The conducting bolt 310 may include a head portion to which torque is applied using a tool, and a threaded body portion. The head portion is a region which is fractured when fastening is completed, and the body portion is configured to be inserted and fastened into the body part 71 when fastening is completed.

Specifically, the conducting bolt 310 includes the head portion fractured and separated when a torque of a predetermined magnitude or more is applied thereto, the threaded body portion below the head portion, and the lower end portion below the body portion.

Each fastening hole configured to be fastened with a bolt may be provided with a screw thread to adjust a fastening force according to a depth of fastening of the conducting bolt 310 and the fixing bolt 330. As described later, the conducting bolt 310 and the fixing bolt 330 may be configured as fracture bolts, the head portions of which are broken when a force of a predetermined magnitude or more is applied.

The conducting bolt 310 and the fixing bolt 330 are configured as fracture bolts, because a connection structure for the power cable 100 according to the present disclosure should be accommodated in a termination connection box, insulating oil or the like is stored outside the connection part, and the heads of bolts and the like should not protrude from a surface of the conductor lead-out rod 70 connected to an end of the power cable 100 so as to prevent electric field concentration.

In this case, the fixing bolt 330 and the conducting bolt 310 may be formed of brass or a brass alloy material.

A conductor connection method using the conductor connection structure having the above-described structure will be described with reference to the drawings below.

Figure 4:
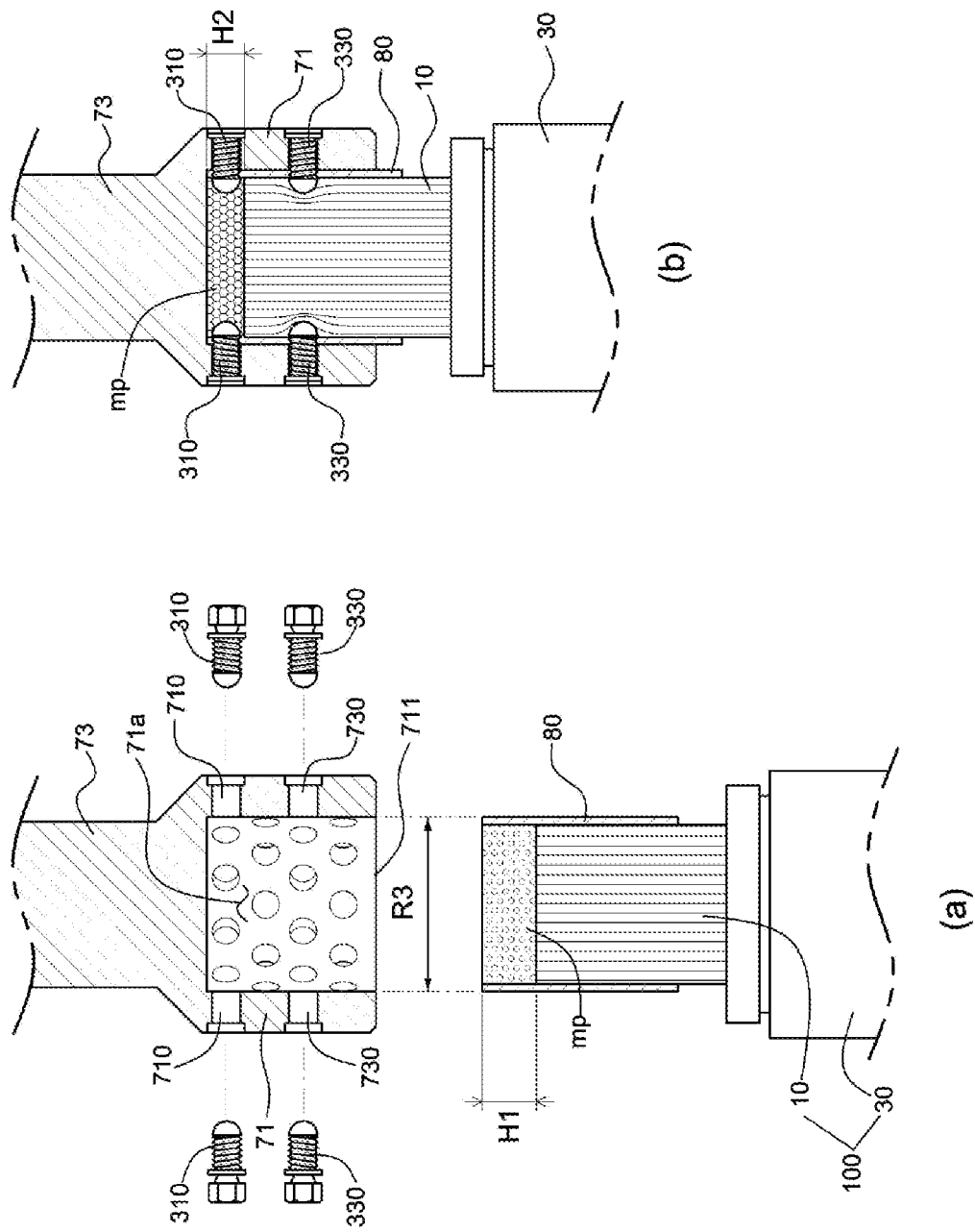
FIG. 4 is a diagram sequentially illustrating a conductor connection method according to an embodiment of the present disclosure.

FIGS. 4(*a*) and (*b*) are diagrams sequentially illustrating a conductor connection method according to an embodiment of the present disclosure.

A conductor connection method of a power cable 100 according to an embodiment of the present disclosure may include: fixing an adapter 80 by inserting a conductor part 10 of the power cable 100 thereinto via an open lower end of the adapter 80, the adapter 80 being formed in a cylindrical shape, an upper end and a lower end of which are open; injecting a plurality of conductive particles mp into an accommodation space 820 between an upper end of the conductor part 10 and the upper end of the adapter 80; inserting the conductor part 10 of the power cable 100, to which the adapter 80 is fixed, into an accommodation groove 71*a* of a conductor lead-out rod 70 via an opening 711 of a lower end of the conductor lead-out rod 70 having a plurality of fastening holes; fixing the conductor part 10 by fastening the conductor lead-out rod 70 with a fixing bolt 310; and applying an electric current to the conductor part 10 by fastening the conductor lead-out rod 70 with a conducting bolt 310 to compress the injected conductive particles mp to reduce voids therein and electrically connecting the conductor part 10 and the conductor lead-out rod 70 through the compressed conductive particles mp.

In the conductor connection structure of the power cable 100 according to the present disclosure, the conductor part 10 of the power cable 100 is electrically connected to the conductor lead-out rod 70 by injecting additional conductive particles mp between the conductor part 10 of the power cable 100, which is to be connected and is inserted into the conductor lead rod 70, and the conductor lead-out rod 70 and fastening the conducting bolt 310 in an inward direction to reduce void between the conductive particles mp, thereby making them closely contact. It is not easy to uniformly surface-contact an end of the conductor part 10 by a method of bringing the conductor part 10 of the power cable 100 in direct contact with the conductor lead-out rod 70, thus inevitably increasing resistance. It will take a very large amount of time to perform a compression method performed after stripping an insulating layer.

However, in the conductor connection structure of the power cable 100 according to the present disclosure, connection to the power cable 100 may be completed by fixing the adapter 80 to the upper end of the conductor part 10, injecting the conductive particles mp into the accommodation space 82 between the upper end of the conductor part 10 and the upper end of the adapter 80, inserting the conductor part 10 of the power cable 100 via an opening in a lower end of the conductor lead-out rod 70 and fixing the conductor part 10 by fastening the fixing bolt 330, and fastening the conducting bolt 310 to minimize void between the conductive particles mp and the conductive particles mp and to complete electrical connection between conductor part 10 of the power cable 100 to be connected and the conductor lead-out rod 70. A process of forming the conductor connection structure of the power cable 100 according to the present disclosure will be described below.

First, as illustrated in FIG. 4(*a*), the adapter 80 is fixed to the upper end of the conductor part 10 by inserting the conductor part 10 through the open lower end of the adapter 80.

In this case, the length by which the upper end of the conductor part 10 of the power cable 100 is inserted into the adapter 80 is set to be smaller than a total length of the adapter 80. That is, as illustrated in FIG. 4(*a*), the upper end of the conductor part 10 is set to be lower than the upper end of the adapter 80 when the upper end of the conductor part 10 is inserted through the lower end of the adapter 80.

In this case, the accommodation space 82 for accommodating the conductive particles mp may be provided between the upper end of the conductor part 10 of the power cable 100 and the upper end of the adapter 80. The accommodation space 82 may have a first depth H1.

Thereafter, a plurality of conductive particles mp may be injected into the accommodation space 82 between the upper end of the conductor part 10 and the upper end of the adapter 80.

In this case, the conductive particles mp are injected into the accommodation space 82 through the open upper portion of the adapter 80 fixed to the upper end of the conductor part 10.

Therefore, the conductive particles mp may be injected while checking the open upper end of the adapter 80 with observation by the naked eyes and thus may be supplied to be uniformly distributed in the accommodation space 82.

The conductive particles mp may be formed of a metal material having high electrical conductivity. For example, the conductive particles mp may be formed of silver, copper or an alloy thereof or a metal material plated with silver, copper or an alloy thereof, and obtained by finely cutting metal wire.

Accordingly, the conductive particles mp may be formed of various materials, such as copper, silver, a copper alloy, a silver alloy, silver-plated copper, a silver-alloy-plated copper, a silver-plated copper alloy, a silver-alloy-plated copper alloy, copper-plated silver, a copper-alloy-plated silver, a copper-plated silver alloy, or a copper-alloy-plated silver alloy. In addition, a plurality of conductive particles mp may be formed of materials in various combinations, provided copper or an alloy thereof or a metal material plated with silver, copper or an alloy thereof is used.

After injecting the conductive particles mp, the conductor part 10 of the power cable 200 to be connected may be inserted into the accommodation groove 71*a* inside the body part 71 through the opening 711 in the lower end of the body part 71.

In this case, there is no need to fasten the plurality of conducting fastening holes 710 formed in the upper portion of the body part 71 by the conducting bolts 310. This is because the conductive particles mp are accommodated inside the adapter 80 and thus are not likely to leak even when the conducting fastening holes 710 are open.

The conductor part 10 may be inserted until the upper end of the adapter 80 reaches the ceiling of the accommodation groove.

Alternatively, the conductor part 10 may be inserted such that the accommodation space 82 may be compressed by the ceiling of the accommodation groove 71a of the body part 71. That is, when a height of the accommodation space 82 is a first height H1 while the adapter 80 is fixed as illustrated in FIG. 4A, the height of the accommodation space 82 is changed to a second height H2 after the conductor part 10 is inserted into the body part 71. The second height H may be less than the first height H1.

The above-described process may be performed by further inserting the conductor part 10 by a certain length after the upper end of the adapter 80 reaches the ceiling of the accommodation groove 71a, when the conductor part 10 is inserted into the accommodation groove 71a through the lower end of the body part 71.

In this case, volume of the accommodation space 82 after insertion of the conductor part 10 into the accommodation groove 71a is less than that of the accommodation space 82 before the insertion of the conductor part 10 into the accommodation groove 71a.

Therefore, when the conductor part 10 is inserted into the accommodation groove 71a of the body part 71, pressure may be applied to the conductive particles mp accommodated in the accommodation groove 71a to reduce voids in the conductive particles mp.

As illustrated in FIG. 4B, the fixing of the conductor part 10 and the applying of the electric current to the conductor part 10 may be performed after the insertion of the conductor part 10 into the accommodation groove 71a of the body part 71.

The fixing of the conductor part 10 to fix the body part 71 of the conductor lead-out rod 70 and the conductor part 10 may be performed by primarily fastening the fixing bolt 330 to pass through the adapter 80 so that the conductor of the conductor part 10 may be plastically deformed or penetrated.

That is, the fixing bolt 330 is preferably primarily fastened to the fastening hole 730 before the mainly fastening of the conducting bolt 310. This prevents the conductor part 10 from being pushed and separated from the body part 71 due to the pressure applied during the primarily fastening of the conducting bolt 310, and strengthens a state of contact between a side surface of an end of the conductor part 10 and the conductive particles mp.

The conductive particles mp may be formed of a metal material, e.g., small metal particles or the like, and a considerable number of voids may exist between the conductive particles mp when the conductive particles mp are simply injected. However, as illustrated in FIG. 4B, when the fastening of the conducting bolt 310 is completed while the fastening of the fixing bolt 330 is completed, the voids between the conductive particles mp are reduced or removed and a contact area between the conductive particles mp and a contact area between the conducive particles mp and the side surfaces of the ends of the conductor part 10 increase, thereby reducing contact resistance. In this case, because the conductor lead-out rod 70 and the conductor part 10 are fixed by the fixing bolt 330, the conductor part 10 may not be pushed and separated from the body part 71 during the mainly fastening of the conducting bolt 310.

In addition, it is preferable that when the conducting bolt 310 is primarily fastened, the conducting bolt 310 pass through the adapter 80 to be in direct contact with the end of the conductor part 10. Specifically, the conducting bolt 310 may include a body portion (with a screw thread) between a lower end portion and a head portion, and a diameter of the body portion may be greater than or equal to a maximum diameter of the lower end of the conducting bolt 310. The shape of the conducting bolt 310 may be implemented by a method of configuring a shape of the lower end portion of the conducting bolt 310 in a hemispherical shape.

As described above, when the fixing bolt 330 is primarily fastened as described above, the upper end of the conductor part 10 is spaced a certain distance from the ceiling of the accommodation space, and the conductor part 10 is fixed to the body part 71 of the conductor lead-out rod 70 in a state in which the accommodation space 82 inside the adapter 80 is filled with the conductive particles mp.

The applying of the electric current to the conductor part 10 may be performed by fastening the body part 71 of the conductor lead-out rod 70 with the conducting bolt 310 to compress the injected conductive particles mp so as to reduce the voids therebetween while the conductor part 10 is fixed to the body part 71 of the conductor lead-out rod 70 and by electrically connecting the conductor lead-out rod 70 and the end of the conductor part 10 through the compressed conductive particles mp.

In the applying of the electric current to the conductor part 10, the conducting bolt 310 to be fastened may pass through the adapter 80 to be in contact with the conductive particles mp compressed by the upper end of the conductor part 10 and the conducting bolt 310 to reduce void therein.

Specifically, when the conducting bolt 310 is primarily fastened, the conducting bolt 310 passes through the adapter 80 to be inserted into the accommodation groove 71a of the body part 71, so that the conductive particles mp may be pressurized and compressed and at the same time, a body part of the conducting bolt 310 may be in contact with the conductor part 10 and the ceiling of the accommodation space. Therefore, the conducting bolt 310, the conductor part 10 and the conductor lead-out rod 70 may be brought into direct contact with one another to connect the compressed conductive particles mp and the ends (surfaces) of the conductor via the conducting bolt 310, thereby diversifying an electric conduction path.

In the above-described embodiment, both the fixing bolt 330 and the conducting bolt 310 pass through the adapter 80 fixed to the upper end of the conductor part 10 during the fixing of the conductor part 10 to the conductor lead-out rod 70 by the fixing bolt 330 and the coupling and connecting electrically the conductor part 10 to the conductor lead-out rod 70 by the conducting bolt 310.

In this case, the adapter 80 may be configured to have a thickness of approximately 0.5 mm to 1.0 mm to maintain the shape thereof even when the conductor part 10 is inserted. In this case, it may take a relatively large amount of work time in a process of fastening the fixing bolt 330 and the conducting bolt 310 to pass through the adapter 80. In particular, when the adapter 80 is not penetrated by the conducting bolt 310 during the fastening of the conducting bolt 310, a force for pressurizing the conductive particles mp by the conducting bolt 310 becomes weak and thus voids between the conductive particles mp may increase.

Figure 5:
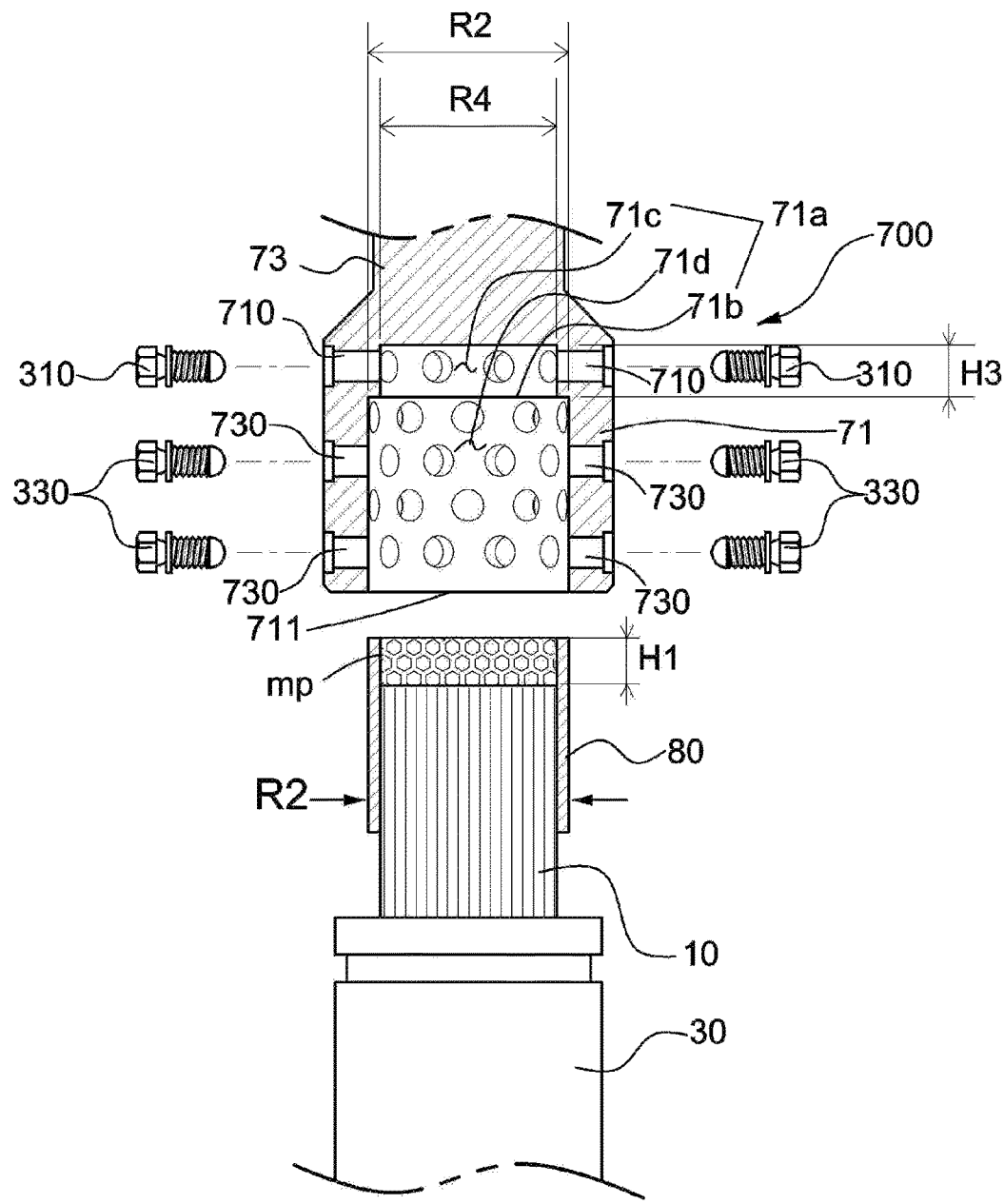
FIG. 5 is an exploded perspective view of a connection structure for connecting a power cable and a conductor lead-out rod according to another embodiment of the present disclosure.
Figure 6:
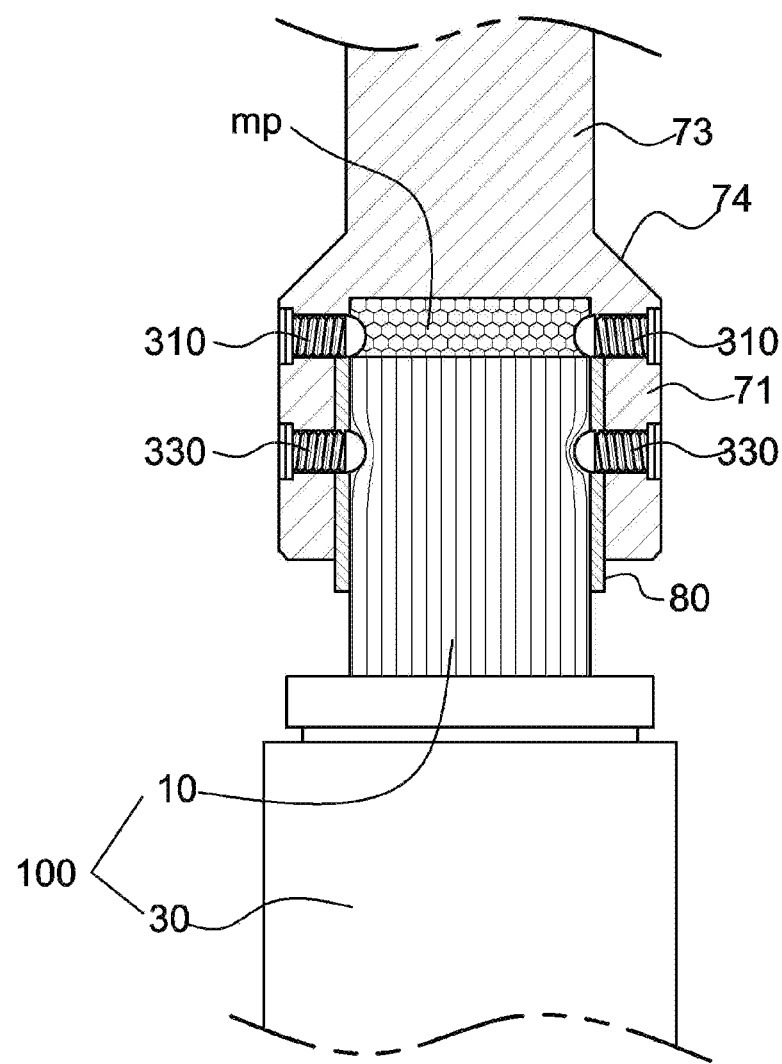
FIG. 6 is a side cross-sectional view of a connection structure for connecting a power cable and a conductor lead-out rod according to another embodiment of the present disclosure.

FIG. 5 is an exploded cross-sectional view of a connection structure, for connecting a power cable and a conductor lead-out rod, according to another embodiment of the present disclosure to address the above problem, and FIG. 6 is an assembled cross-sectional view. The following embodiments will be described focusing on the differences from the previous embodiments, in which the same reference numerals are assigned to components that are the same as those in the previous embodiments.

Referring to FIGS. 5 and 6, a conductor connection device, of a power cable, for connecting a conductor part 10 consisting of a plurality of wires of a power cable 100 to a termination box, according to the present embodiment includes a conductor lead-out rod 70.

The conductor lead-out rod 70 according to the present embodiment includes: an open lower end and provides therein an accommodation groove 71a into which an upper end of the conductor part 10 inserted into an adapter 80; a plurality of conducting fastening holes 710 formed at predetermined intervals in a circumferential direction; and fixing fastening holes 730 formed at predetermined intervals below the plurality of conducting fastening hole 710 in the circumferential direction. A stopper 71b may be formed on an inner circumference of the accommodation groove 71a to prevent the adapter 80 to a certain height or more during insertion of the conductor part 10 of the power cable 100.

That is, the accommodation groove 71a may be provided in the conductor lead-out rod 70 according to the present embodiment. The accommodation groove 71a may be divided into a conductor part accommodation groove 71d and a conductive particle accommodation groove 71c.

In this case, an inner diameter R3 of the conductor part accommodation groove 71d may substantially correspond to or be greater by a certain value than an outer diameter R2 of the adapter 80. Accordingly, the conductor part 10 to which the adapter 80 is fixed is insertable into the conductor part accommodation groove 71d.

In addition, an inner diameter of the conductive particle accommodation groove 71c may be formed to correspond to an inner diameter of the adapter 80 or an outer diameter of the conductor part 10. In this case, the adapter 80 is prevented from being inserted into the conductive particle accommodation groove 71c.

Accordingly, a stopper 71b protruding toward the inside of the accommodation groove 71a may be provided between the conductor part accommodation groove 71d and the conductive particle accommodation groove 71c. That is, the conductor particle accommodation groove 71c is provided above the stopper 71b and the conductor part accommodation groove 71d is provided below the stopper 71b.

A process of inserting the conductor part 10 will now be described. The adapter 80 is inserted into an end of the conductor part 10, conductive particles mp are injected between an upper end of the conductor part 10 and an upper end of the adapter 80, and the conductor part 10 to which the adapter 80 is fixed is inserted into the conductor lead-out rod 70 having a configuration as described above.

In this case, when the upper end of the adapter 80 passes the conductor part accommodation groove 71d and reaches the stopper 71b, the upper end of the adapter 80 is caught by the stopper 71b and thus a height of insertion of the adapter 80 is limited. In contrast, the conductive particles mp pass the upper end of the adapter 80 and rise into the conductive particle accommodation groove 71c and thus are exposed inside the conductor particle accommodation groove 71c.

Accordingly, the adapter 80 is provided along an inner wall of the conductor part accommodation groove 71d, and only the conductive particles mp are accommodated in the conductive particle accommodation groove 71c.

When the upper end of the conductor part 10 is inserted through a lower end of the adapter 80, a first height H1 of an accommodation space on the conductor part 10 may be less than a height H3 of the conductive particle accommodation groove 71c.

Accordingly, when the conductor part 10 is inserted and the height of insertion of the adapter 80 is limited by the stopper 71b, thus exposing the conductive particles mp via the conductive particle accommodation groove 71c, the conductive particles mp may be compressed by the upper end of the conductor part 10 and the inner wall of the conductive particle accommodation groove 71c, thereby reducing voids between the conductive particles mp.

A plurality of conducting fastening holes 710 into which a plurality of conducting bolts 310 are to be fastened may be formed at predetermined intervals on an upper portion of the body part 71 in a circumferential direction. In the present embodiment, the conducting fastening holes 710 may be formed above the body part 71 to a height greater than or equal to the height of insertion of the adapter 80 or higher. That is, the conducting fastening holes 710 may be formed above the stopper 71b or formed to communicate with the conductive particle accommodation groove 71c.

Therefore, voids in the conductive particles mp may be reduced by compressing the conductive particles mp by primarily fastening the conducting bolts 310 through the conducting fastening holes 710, when the height of insertion of the adapter 80 is limited by the stopper 71b during the insertion of the conductor part 10 into the accommodation groove 71a and thus the conductive particles mp are exposed via the conductive particles accommodation groove 71c.

Similarly, a plurality of fixing fastening holes 730 to be fastened with a plurality of fixing bolts 330 may be formed at predetermined intervals under the body part 71 in the circumferential direction. In this case, the fastening holes 730 may be formed on the body part 71 and below the stopper 71b or formed to communicate with the conductor part accommodation groove 71d.

Figure 7:
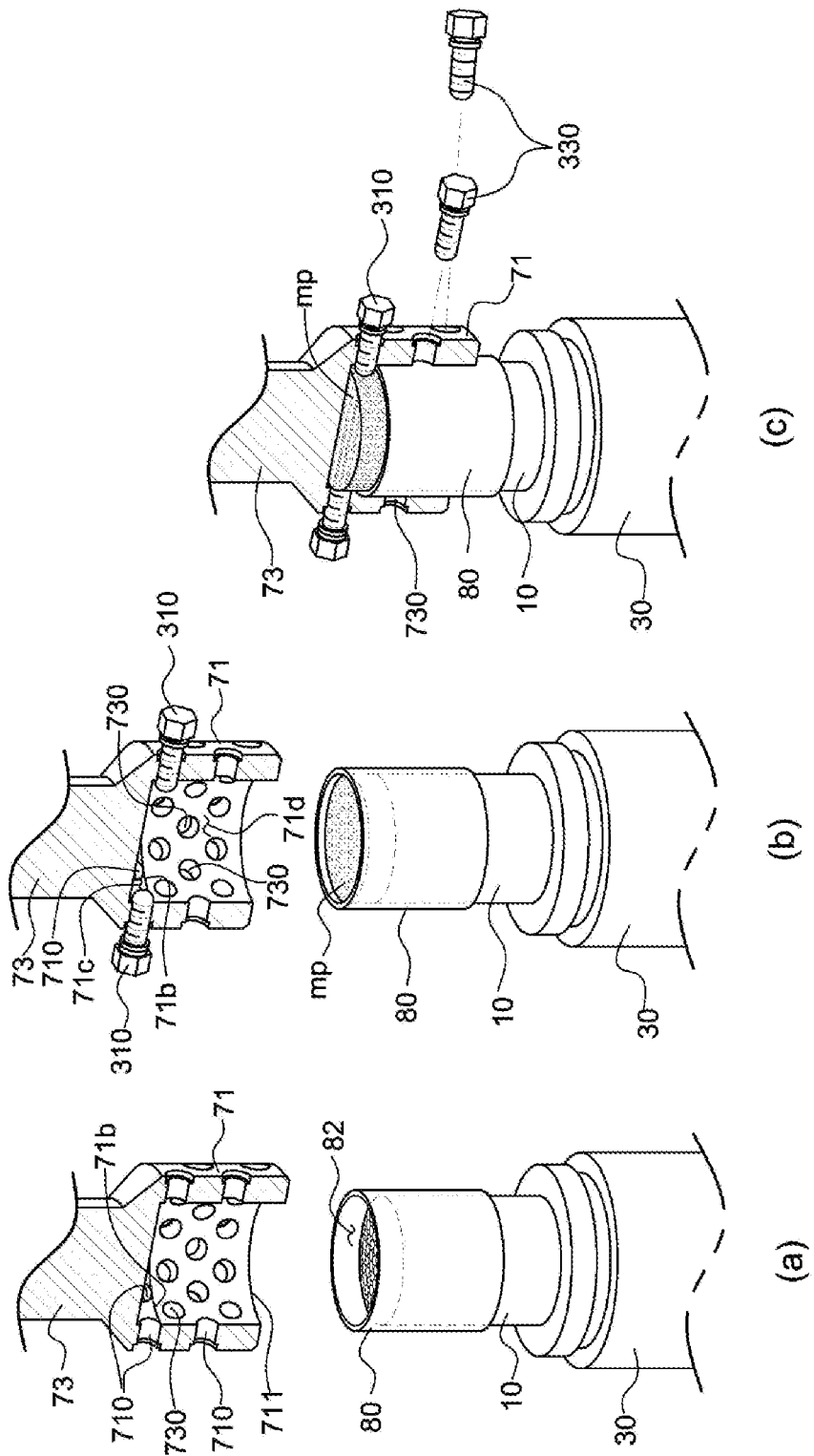
FIG. 7 is a diagram sequentially illustrating a conductor connection method according to another embodiment of the present disclosure.

A connection method of a conductor connection structure according to the present embodiment will be described with reference to FIG. 7 below.

A conductor connection method of a power cable 100 according to an embodiment of the present disclosure may include: fixing an adapter 80 by inserting a conductor part 10 of the power cable 100 thereinto via an open lower end of the adapter 80, the adapter 80 being formed in a cylindrical shape, an upper end and a lower end of which are open; injecting a plurality of conductive particles mp into an accommodation space 820 between an upper end of the conductor part 10 and the upper end of the adapter 80; inserting the conductor part 10 of the power cable 100, to which the adapter 80 is fixed, into an accommodation groove 71a of a conductor lead-out rod 70 via an opening 711 of a lower end of the conductor lead-out rod 70 having a plurality of fastening holes; fixing the conductor part 10 by fastening the conductor lead-out rod 70 with a fixing bolt 310; and applying an electric current to the conductor part 10 by fastening the conductor lead-out rod 70 with a conducting bolt 310 to compress the injected conductive particles mp to reduce voids therein and electrically connecting the conductor part 10 and the conductor lead-out rod 70 through the compressed conductive particles mp.

First, as illustrated in FIG. 7(a), the conductor part 10 is inserted through the open lower end of the adapter 80 to fix the adapter 80 to the upper end of the conductor part 10.

In this case, the length by which the upper end of the conductor part 10 of the power cable 100 is inserted into the adapter 80 is set to be smaller than a total length of the adapter 80. That is, as illustrated in FIG. 7(a), the upper end of the conductor part 10 is set to be lower than the upper end of the adapter 80 when the upper end of the conductor part 10 is inserted through the lower end of the adapter 80.

In this case, an accommodation space 82 for accommodating the conductive particles mp is provided between the upper end of the conductor part 10 of the power cable 100 and the upper end of the adapter 80.

Next, as illustrated in FIG. 7(b), the plurality of conductive particles mp may be injected into the receiving space 82 between the upper end of the conductor part 10 and the upper end of the adapter 80.

In this case, the conductive particles mp are injected into the accommodation space 82 through the open upper portion of the adapter 80 fixed to the upper end of the conductor part 10.

Therefore, the conductive particles mp may be injected while checking the open upper end of the adapter 80 with eyes and thus may be supplied to be uniformly distributed in the accommodation space 82.

After injecting the conductive particles mp, the conductor part 10 of the power cable 200 to be connected may be inserted into the accommodation groove 71a inside the body part 71 through the opening 711 in the lower end of the body part 71.

In this case, the inserting of the conductor part 10 may be performed by temporarily fastening all conducting fastening holes 710 in an upper portion of the body part 71 with the conducting bolts 310, and inserting the conductor part 10, to which the adapter 80 is fixed, into the accommodation groove 71a in the body part 71 through the opening 711 in the lower end of the body part 71.

Unlike the embodiment described above with reference to FIG. 3, in the present embodiment, a height of insertion of the adapter 80 is limited during the insertion of the conductor part 10, thus causing exposure of the conductive particles mp via a conductive particle accommodation groove 71c, and thus all the plurality of conducting fastening holes 710 are temporarily fastened with the conducting bolts 310 to prevent leakage of the conductive particles mp via the conducting fastening holes 710.

Although not shown in the drawings, the fixing bolt 330 may be temporarily fastened into a fixing fastening hole 730 while the conductor part 10 is inserted into the body part 71. This is because when primary fastening is performed using fracture of a head portion of the fixing bolt 330, the conductor part 10 may be plastically deformed by the fixing bolt 330 and conductor wires may be introduced into the accommodation space, thus causing injection and interference of the conductive particles mp.

When the upper end of the adapter 80 passes a conductor part accommodation groove 71d and reaches a stopper 71b during the insertion of the conductor part 10, the upper end of the adapter 80 is caught by the stopper 71b, thereby limiting the height of insertion of the adapter 80. In contrast, the conductive particles mp pass the upper end of the adapter 80 and continue to rise into a conductive particle accommodation groove 71c and thus are exposed inside the conductor particle accommodation groove 71c. Accordingly, the adapter 80 is provided along an inner wall of the conductor part accommodation groove 71d, and only the conductive particles mp are accommodated in the conductive particle accommodation groove 71c.

When the upper end of the conductor part 10 is inserted through the lower end of the adapter 80, a first height H1 of an accommodation space on the conductor part 10 may be less than a height H3 of the conductive particle accommodation groove 71c.

Accordingly, when the conductor part 10 is inserted and the height of insertion of the adapter 80 is limited by the stopper 71b, thus exposing the conductive particles mp via the conductive particle accommodation groove 71c, the conductive particles mp may be compressed by the upper end of the conductor part 10 and the inner wall of the conductive particle accommodation groove 71c, thereby reducing voids between the conductive particles mp.

As illustrated in FIG. 7(c), the fixing of the conductor part 10 and the applying of the electric current to the conductor part 10 may be performed after the insertion of the conductor part 10 into the accommodation groove 71a of the body part 71.

The fixing of the conductor part 10 to fix the body part 71 of the conductor lead-out rod 70 and the conductor part 10 may be performed by primarily fastening the fixing bolt 330 to pass through the adapter 80 so that the conductor of the conductor part 10 may be plastically deformed or penetrated.

That is, the fixing bolt 330 is preferably primarily fastened to the fastening hole 730 before the mainly fastening of the conducting bolt 310. This prevents the conductor part 10 from being pushed and separated from the body part 71 due to the pressure applied during the primarily fastening of the conducting bolt 310, and strengthens a state of contact between a side surface of an end of the conductor part 10 and the conductive particles mp.

The conductive particles mp may be formed of a metal material, e.g., small metal particles or the like, and a considerable number of voids may exist between the conductive particles mp when the conductive particles mp are simply injected. However, as illustrated in FIG. 7(c), when the fastening of the conducting bolt 310 is completed while the fastening of the fixing bolt 330 is completed, the voids between the conductive particles mp are reduced or removed and a contact area between the conductive particles mp and a contact area between the conducive particles mp and the side surfaces of the ends of the conductor part 10 increase, thereby reducing contact resistance. In this case, because the conductor lead-out rod 70 and the conductor part 10 are fixed by the fixing bolt 330, the conductor part 10 may not be pushed and separated from the body part 71 during the mainly fastening of the conducting bolt 310.

The conducting bolt 310 may be primarily fastened in direct contact with the end of the conductor part 10. In the present embodiment, unlike the embodiment of FIG. 3, the conducting bolt 310 does not pass through the adapter 80 and is brought in direct contact with the conductive particles mp to compress the conductive particles mp. This is because the height of insertion of the adapter 80 is limited by the stopper 71b as described above. Therefore, the conducting bolt 310 may be easily primarily fastened unlike in the embodiment of FIG. 3, and the conductive particles mp may be directly compressed to minimize voids therebetween.

Specifically, the conducting bolt 310 may include a body portion (with a screw thread) between a lower end portion and a head portion, and a diameter of the body portion may be greater than or equal to a maximum diameter of the lower end of the conducting bolt 310. The shape of the conducting bolt 310 may be implemented by a method of configuring a shape of the lower end portion of the conducting bolt 310 in a hemispherical shape.

As described above, when the fixing bolt 330 is primarily fastened as described above, the upper end of the conductor part 10 is spaced a certain distance from the ceiling of the accommodation space and the conductor part 10 is fixed to the body part 71 of the conductor lead-out rod 70 in a state in which the inside of the conductive particle accommodation groove 71c is filled with the conductive particles mp.

The applying of the electric current to the conductor part 10 may be performed by fastening the body part 71 of the conductor lead-out rod 70 with the conducting bolt 310 to compress the injected conductive particles mp so as to reduce the voids therebetween while the conductor part 10 is fixed to the body part 71 of the conductor lead-out rod 70 and by electrically connecting the conductor lead-out rod 70 and the end of the conductor part 10 through the compressed conductive particles mp.

In the applying of the electric current to the conductor part 10, the conducting bolt 310 may be fastened to be in contact with the conductive particles mp which is compressed by the upper end of the conductor part 10 and the conducting bolt 310 to reduce voids therein.

Specifically, when the conducting bolt 310 is fastened, the conducting bolt 310 is inserted into the conductor particle accommodation groove 71c to pressurize and compress the conductive particles mp and to bring the body portion of the conducting bolt 310 into contact with the conductor part 10 and the ceiling of the accommodation space. Therefore, the conducting bolt 310, the conductor part 10 and the conductor lead-out rod 70 may be brought into direct contact with one another to connect the compressed conductive particles mp and the ends (surfaces) of the conductor via the conducting bolt 310, thereby diversifying an electric conduction path.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A connection structure, for connecting a power cable and a conductor lead-out rod, which connects a conductor part including a plurality of wires of a power cable to a conductor lead-out rod of a termination connection box, the connection structure comprising:
    a conductor part of a power cable;
    an adapter configured into which the conductor part is inserted through an open lower end thereof, the adapter being formed in a cylindrical shape, an upper end and the lower end of which are open;
    a conductor lead-out rod providing an accommodation groove into which the conductor part of the power cable inserted into the adapter is inserted via an opening in a lower end thereof, the conductor lead-out rod including a plurality of fastening holes;
    a plurality of conductive particles injected into an accommodation space on an upper end of the conductor part inserted into the accommodation groove of the conductor lead-out rod to electrically connect the conductor part and the conductor lead-out rod comprising a body part providing the accommodation groove which has an opening in a lower end thereof and into which an upper end of the conductor part inserted into the adapter is inserted, the body part including a plurality of conducting fastening holes into which a plurality of conducting bolts are fastened are provided in an upper portion of the body part at predetermined intervals in a circumferential direction, and a plurality of fixing fastening holes into which a plurality of fixing bolts are fastened are provided in a lower portion of the body part at predetermined intervals in the circumferential direction;
    a plurality of conducting bolts configured to be fastened into the conducting fastening holes fastening hole to apply pressure directly to the conductive particles injected into the accommodation space so as to reduce voids in the conductive particles and to electrically connect the conductor part and the conductor lead-out rod; and
    a plurality of fixing bolts configured to be fastened into the fixing fastening holes to fix the conductor part inserted into the accommodation groove.

2. The connection structure of claim 1, wherein the conducting bolt and the fixing bolt each comprise a fracture bolt, a head portion of which is fractured and separated when a torque of a predetermined magnitude or more is applied thereto.

3. The connection structure of claim 1, wherein, when the conducting bolt is fastened while the conductive particles are injected into the accommodation space, the conducting bolt passes through the adapter and is brought into contact with the conductive particles compressed by an upper end of the conductor part.

4. The connection structure of claim 1, wherein the conductive particles comprise silver, copper, an alloy thereof, or a metal material plated with silver, copper or the alloy thereof.

5. The connection structure of claim 4, wherein the conductive particles comprise cut copper wires or silver-plated cut copper wires.

6. The connection structure of claim 1, wherein the conductor lead-out rod and the adapter are each formed of tin-plated copper or a tin-plated copper alloy.

7. The connection structure of claim 1, wherein the fixing bolt and the conducting bolt are each formed of brass or a brass alloy.

8. The connection structure of claim 1, wherein a thickness of the adapter is in a range of 0.1 mm to 1.0 mm.

9. The connection structure of claim 1, wherein the conducting fastenings hole and the fixing fastening holes are alternately formed in a direction perpendicular to the body part.

10. A connection structure, for connecting a power cable and a conductor lead-out rod, which connects a conductor part including a plurality of wires of a power cable to a conductor lead-out rod of a termination connection box, the connection structure comprising:
    a conductor part of a power cable;
    an adapter configured into which the conductor part is inserted through an open lower end thereof, the adapter being formed in a cylindrical shape, an upper end and the lower end of which are open;
    a conductor lead-out rod providing an accommodation groove into which the conductor part of the power cable inserted into the adapter is inserted into an opening in a lower end thereof, the conductor lead-out rod including: a stopper configured to prevent the adapter from being inserted above a predetermined height into the accommodation groove during the insertion of the conductor part of the power cable, the stopper being formed on an inner circumference of the accommodation groove; and
    a plurality of fastening holes the conductor lead-out rod comprising a body part providing the accommodation groove which has an opening in a lower end thereof and into which an upper end of the conductor part inserted into the adapter is inserted, the body part including a plurality of conducting fastening holes into which a plurality of conducting bolts are fastened are provided in an upper portion of the body part at predetermined intervals in a circumferential direction, and a plurality of fixing fastening holes into which a plurality of fixing bolts are fastened are provided in a lower portion of the body part at predetermined intervals in the circumferential direction;

a plurality of conductive particles injected into an accommodation space in an upper portion of an upper end of the conductor part inserted into the accommodation groove of the conductor lead-out rod, the conductive particles being exposed via the accommodation groove during the insertion of the conductor part into the accommodation groove, thus electrically connecting the conductor part and the conductor lead-out rod;

a plurality of conducting bolts configured to be fastened into the conducting fastening holes to apply pressure directly to the conductive particles injected into the accommodation space so as to reduce voids in the conductive particles and to electrically connect the conductor part and the conductor lead-out rod; and a plurality of fixing bolts configured to be fastened into the fixing fastening holes to fix the conductor part inserted into the accommodation groove.

11. The connection structure of claim 10, wherein the conducting bolt and the fixing bolt each comprise a fracture bolt, a head portion of which is fractured and separated when a torque of a predetermined magnitude or more is applied thereto.

12. The connection structure of claim 10, wherein, when the conducting bolt is fastened while the conductive particles are injected into the accommodation space, the conducting bolt is brought into contact with the conductive particles compressed by an upper end of the conductor part.

13. The connection structure of claim 10, wherein the conductor lead-out rod comprises:

a body part providing the accommodation groove which includes an opening at a lower end thereof and into which the upper end of the conductor part inserted into the adapter is inserted; and an extension extending upward from the upper end of the body part, and a plurality of conducting fastening holes into which a plurality of conducting bolts are fastened are formed on an upper portion of the body part at predetermined intervals in a circumferential direction, and a plurality of fixing fastening holes into which a plurality of fixing bolts are fastened are formed on a lower portion of the body part at predetermined intervals in the circumferential direction.

14. The connection structure of claim 13, wherein the conducting fastening hole is formed on the upper portion of the body part at a height equal to or greater than a height of insertion of the adapter.

15. A conductor connection device for connecting a conductor part of a power cable to a conductor lead-out rod, the conductor connection device comprising:

an adapter, an upper end and a lower end of which are open and thus into which an upper end of the conductor part is inserted through the lower end;

a conductor lead-out rod providing an accommodation groove, a lower end of which is open and thus into which the conductor part inserted into the adapter is inserted, the conductor lead-out rod including: a plurality of conducting fastening holes provided at predetermined intervals in a circumferential direction; and a plurality of fixing fastening holes provided at predetermined intervals below the plurality of conducting fastening holes in the circumferential direction;

a plurality of conducting bolts fastened into the conducting fastening hole to electrically connect the conductor part and the conductor lead-out rod;

a plurality of fixing bolts fastened into the fixing fastening hole to fix the conductor part accommodated in the accommodation groove of the conductor lead-out rod; and a plurality of conductive particles accommodated in an accommodation space on an upper end of the conductor part inserted into the accommodation groove of the conductor lead-out rod to electrically connect the conductor part and the conductor lead-out rod, wherein the conducting bolts apply pressure directly to the conductive particles injected into the accommodation space so as to reduce voids in the conductive particles and to electrically connect the conductor part and the conductor lead-out rod.

16. A conductor connection device for connecting a conductor part of a power cable to a conductor lead-out rod, the conductor connection device comprising:

an adapter, an upper end and a lower end of which are open and thus into which an upper end of the conductor part is inserted through the lower end;

a conductor lead-out rod providing an accommodation groove, a lower end of which is open and thus into which the conductor part inserted into the adapter is inserted, the conductor lead-out rod including: a plurality of conducting fastening holes provided at predetermined intervals in a circumferential direction; and a plurality of fixing fastening holes provided at predetermined intervals below the plurality of conducting fastening holes in the circumferential direction, wherein a stopper is provided on an inner circumference of the accommodation groove to prevent the adapter from being inserted above a predetermined height during the insertion of the conductor part of the power cable;

a plurality of conducting bolts fastened into the conducting fastening hole to electrically connect the conductor part and the conductor lead-out rod;

a plurality of fixing bolts fastened into the fixing fastening hole to fix the conductor part accommodated in the accommodation groove of the conductor lead-out rod; and a plurality of conductive particles accommodated in an accommodation space on an upper end of the conductor part inserted into the accommodation groove of the conductor lead-out rod, the conductive particles being exposed via the accommodation groove during downward movement of the adapter, thus electrically connecting the conductor part and the conductor lead-out rod, wherein the conducting bolts apply pressure directly to the conductive particles injected into the accommodation space so as to reduce voids in the conductive particles and to electrically connect the conductor part and the conductor lead-out rod.

17. The connection device of claim 16, wherein the conducting fastening hole is formed on the upper portion of the body part at a height equal to or greater than a height of insertion of the adapter.

18. The connection device of claim 16, wherein the accommodation groove comprises: a conductive particle accommodation groove provided above the stopper to accommodate the conductive particles; and a conductor part accommodation groove which is provided below the stopper and into which the conductor part injected into the adapter is inserted.

19. The connection device of claim 18, wherein the conducting fastening hole is formed to communicate with the conductive particle accommodation groove, and the fixing fastening hole is formed to communicate with the conductor part accommodation groove.

* * * * *